United States Patent
Chun et al.

(10) Patent No.: US 11,070,963 B2
(45) Date of Patent: *Jul. 20, 2021

(54) METHOD AND USER EQUIPMENT FOR TRANSMITTING DATA UNIT, AND METHOD AND USER EQUIPMENT FOR RECEIVING DATA UNIT

(71) Applicant: LG Electronics Inc., Seoul (KR)

(72) Inventors: Sungduck Chun, Seoul (KR); Laeyoung Kim, Seoul (KR); Dongsoo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/838,768

(22) Filed: Apr. 2, 2020

(65) Prior Publication Data
US 2020/0236519 A1    Jul. 23, 2020

Related U.S. Application Data

(63) Continuation of application No. 16/087,473, filed as application No. PCT/KR2017/003069 on Mar. 22, 2017, now Pat. No. 10,638,285.
(Continued)

(51) Int. Cl.
*H04W 4/40* (2018.01)
*H04W 80/08* (2009.01)
*H04W 28/06* (2009.01)
*H04W 80/06* (2009.01)
*H04W 84/04* (2009.01)

(52) U.S. Cl.
CPC ............. *H04W 4/40* (2018.02); *H04W 28/06* (2013.01); *H04W 80/06* (2013.01); *H04W 80/08* (2013.01); *H04W 84/042* (2013.01)

(58) Field of Classification Search
CPC ....... H04W 4/40; H04W 28/06; H04W 80/06; H04W 80/08; H04W 84/042
See application file for complete search history.

(56) References Cited

U.S. PATENT DOCUMENTS 10,638,285 B2 * 4/2020 Chun ................... H04W 28/06
2015/0358856 A1 12/2015 Stanwood et al.
(Continued)

FOREIGN PATENT DOCUMENTS

| CN | 103457873 | 12/2013 |
| CN | 103503509 | 1/2014 |
| KR | 20140130051 | 11/2014 |

OTHER PUBLICATIONS

ZTE, "Enhancements for eNB type RSU and UE type RSU," R2-156613, 3GPP TSG RAN WG2 #92, Anaheim, USA, dated Nov. 16-20, 2015, 7 pages, XP051040401.
Extended European Search Report in European Application No. 17770611.6, dated Oct. 1, 2019, 7 pages.
International Search Report in International Application No. PCT/KR2017/003069, dated Jun. 26, 2017, 16 pages (with English Translation).
(Continued)

*Primary Examiner* — Diane D Mizrahi
(74) *Attorney, Agent, or Firm* — Fish & Richardson P.C.

(57) ABSTRACT

A user equipment (UE) may receive or transmit a protocol data unit (PDU). The PDU includes a service data unit (SDU) type field. The SDU type field may be set to a value indicating a vehicle-to-everything (V2X) type. When the SDU type field is set to a value indicating a V2X type, the PDU may include an additional field indicating an application or protocol type for data of an SDU in the PDU.

14 Claims, 10 Drawing Sheets

Related U.S. Application Data

(60) Provisional application No. 62/326,013, filed on Apr. 22, 2016, provisional application No. 62/313,147, filed on Mar. 25, 2016, provisional application No. 62/311,427, filed on Mar. 22, 2016.

(56) References Cited

U.S. PATENT DOCUMENTS

| | | | |
|---|---|---|---|
| 2015/0381751 | A1 | 12/2015 | Haran |
| 2016/0080531 | A1 | 3/2016 | Agiwal |
| 2016/0219024 | A1 | 7/2016 | Verzun et al. |
| 2016/0345198 | A1* | 11/2016 | Lee .................. H04W 24/08 |
| 2017/0331577 | A1 | 11/2017 | Parkvall et al. |
| 2017/0331670 | A1 | 11/2017 | Parkvall et al. |
| 2020/0120482 | A1* | 4/2020 | Parkvall ................ H04W 8/18 |
| 2020/0229206 | A1* | 7/2020 | Badic .................. H04B 17/318 |

OTHER PUBLICATIONS

Anaya et al., "A Novel Geo-Broadcast Algorithm for V2V Communications over WSN," in: electronics 2014, doi:10.3390/electronics3030521, pp. 521-537, Aug. 28, 2014.

Fazio et al., "Vehicular Networks and Road Safety: an Application for Emergency/Danger Situations Management Using the WAVE/802.11 p Standard," in: ResearchGate.net, Advance in Electrical and Electronic Engineering (AEEE), vol. 11, No. 5, Special Issue, pp. 357-364, Feb. 5, 2015.

Ericsson, "Layer- 2 Protocol Stack for PC5-based V2X," 'Tdoc R2-161572' 3GPP TSG-RAN WG2 #93, Malta, Feb. 15-19, 2016, 8 pages.

CN Office Action in Chinese Appln. No. 201780018522.6, dated Jan. 29, 2021, 19 pages (with English translation).

* cited by examiner

| SDU Type = 000 (IP for non-V2X) | Non-V2X data of IP type |
|---|---|

FIG. 13A

| SDU Type = 011 (IP for V2X) | ITS Application Type =V2X App A | V2X App A data of IP type |
|---|---|---|

FIG. 13B

| SDU Type = 100 (non-IP for non-V2X) | Non-V2X data of non-IP type |
|---|---|

FIG. 13C

| SDU Type = 101 (non-IP for V2X) | ITS Application Type =V2X App B | V2X App B data of non-IP type |
|---|---|---|

FIG. 13D

METHOD AND USER EQUIPMENT FOR TRANSMITTING DATA UNIT, AND METHOD AND USER EQUIPMENT FOR RECEIVING DATA UNIT

CROSS-REFERENCE TO RELATED APPLICATIONS

This application is a continuation of U.S. application Ser. No. 16/087,473, filed on Sep. 21, 2018, now allowed, which is a National Stage application under 35 U.S.C. § 371 of International Application No. PCT/KR2017/003069, filed on Mar. 22, 2017, which claims the benefit of U.S. Provisional Application No. 62/326,013, filed on Apr. 22, 2016, U.S. Provisional Application No. 62/313,147, filed on Mar. 25, 2016, and U.S. Provisional Application No. 62/311,427, filed on Mar. 22, 2016. The disclosures of the prior applications are incorporated by reference in their entirety.

TECHNICAL FIELD

The present invention relates to a wireless communication system and, more particularly, to a method and apparatus for transmitting/receiving a data unit.

BACKGROUND

Wireless communication systems have been widely deployed to provide various types of communication services such as voice or data. In general, the wireless communication system corresponds to a multiple access system capable of supporting communication between multiple users by sharing available system resources (e.g., bandwidth, transmission power, etc.). For example, the multiple access system includes a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

SUMMARY

There is a need for a method of efficiently processing vehicle application data in a V2X (Vehicle to Everything) communication system.

The technical objects that can be achieved through the present invention are not limited to what has been particularly described hereinabove and other technical objects not described herein will be more clearly understood by persons skilled in the art from the following detailed description.

A user equipment (UE) may receive or transmit a protocol data unit (PDU). The PDU includes a service data unit (SDU) type field. The SDU-type field may be set to a value indicating a V2X (Vehicle-to-Everything) type. When the SDU-type field is set to the value indicating the V2X type, the PDU may include an additional field indicating an application or protocol type for data of the SDU in the PDU.

The SDU-type field indicating the type of the SDU in the PDU may indicate whether at least the data of the SDU is of Internet protocol (IP) type for V2X, IP type for non-V2X, non-IP type for V2X or non-IP type for non-V2X.

According to an aspect of the present invention, a method of receiving a data unit at a user equipment (UE) in a wireless communication system is provided. The method may comprise: receiving a protocol data unit (PDU); and transferring a service data unit (SDU) included in the PDU to an upper layer or deleting the SDU, based on an additional field in the PDU, when an SDU-type field in the PDU is set to a value indicating a vehicle-to-everything (V2X) type. The additional field may indicate an application or protocol type corresponding to data of the SDU.

According to another aspect of the present invention, a user equipment (UE) for receiving a data unit in a wireless communication system is provided. The UE may include a radio frequency (RF) unit and a processor configured to control the RF unit. The processor may be configured to: control the RF unit to receive a protocol data unit (PDU); and transmit a service data unit (SDU) included in the PDU to an upper layer or to delete the SDU, based on an additional field in the PDU, when an SDU-type field in the PDU is set to a value indicating a vehicle-to-everything (V2X) type. The additional field may indicate an application or protocol type corresponding to data of the SDU.

According to another aspect of the present invention, a method of transmitting a data unit at a user equipment (UE) in a wireless communication system is provided. The method may include generating a protocol data unit (PDU) including a service data unit (SDU) containing vehicle-to-everything (V2X) data generated at an upper layer; and transmitting the PDU. The PDU may include an SDU-type field set to a value indicating that the SDU is of a V2X type and an additional field indicating an application or protocol type corresponding to data of the SDU.

According to another aspect of the present invention, a user equipment (UE) for transmitting a data unit in a wireless communication system is provided. The UE may include a radio frequency (RF) unit and a processor configured to control the RF unit. The processor may be configured to generate a protocol data unit (PDU) including a service data unit (SDU) containing vehicle-to-everything (V2X) data generated at an upper layer and to control the RF unit to transmit the PDU. The PDU may include an SDU-type field set to a value indicating that the SDU is of a V2X type and an additional field indicating an application or protocol type corresponding to data of the SDU.

In each aspect of the present invention, the SDU-type field may discriminate whether at least the data of the SDU is Internet protocol (IP) type for V2X, IP type for non-V2X, non-IP type for V2X or non-IP type for non-V2X.

In each aspect of the present invention, the SDU may be transferred to the upper layer when the UE supports the application or protocol type and may be deleted when the UE does not support the application or protocol type.

In each aspect of the present invention, the upper layer may be an intelligent transport systems (ITS) layer.

The above technical solutions are merely some parts of the embodiments of the present invention and various embodiments into which the technical features of the present invention are incorporated can be derived and understood by persons skilled in the art from the following detailed description of the present invention.

It is possible to efficiently process vehicle application data in a V2X (Vehicle to Everything) communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIGS. 13A to 13D are PDCP PDU structures according to the present invention.

DETAILED DESCRIPTION

Figure 1:
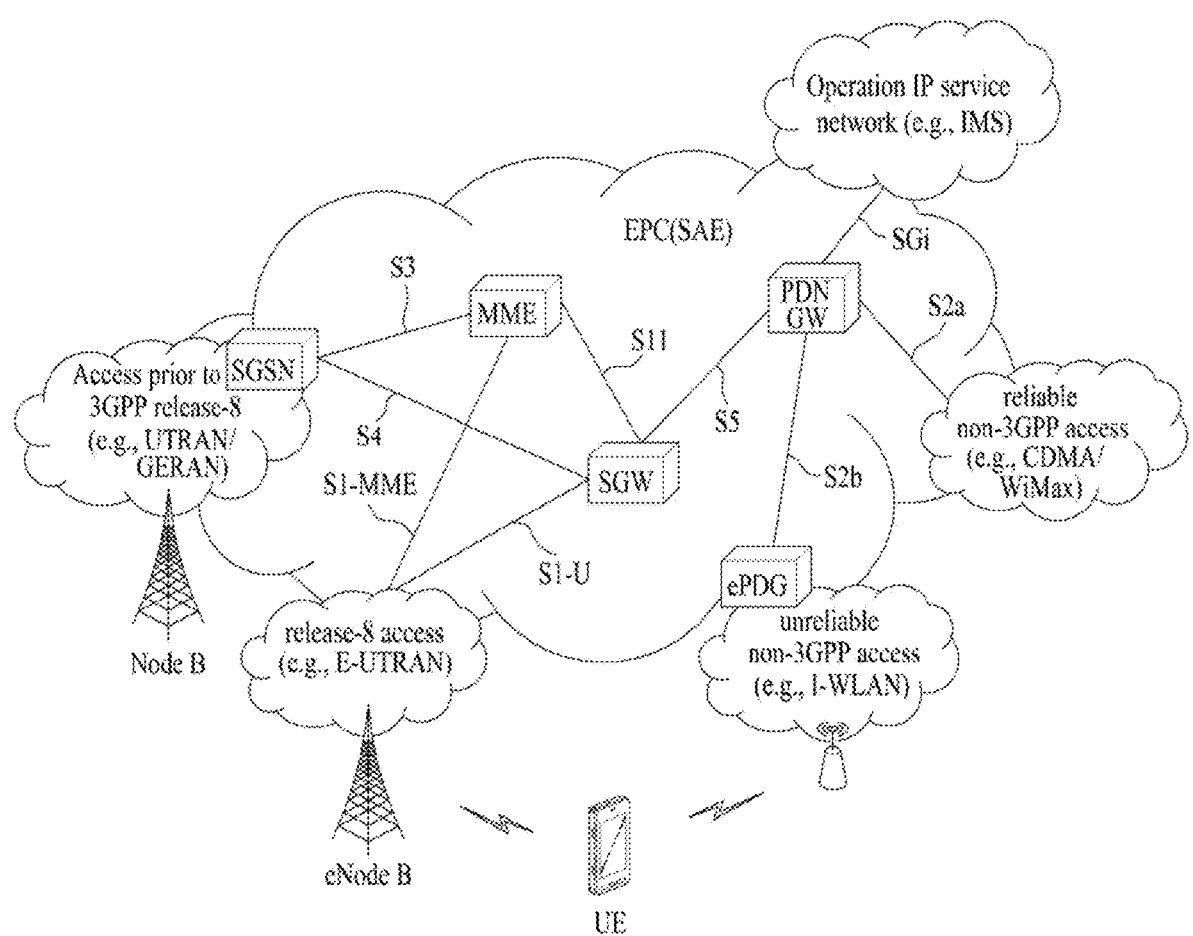
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.300, 3GPP TS 36.321, 3GPP TS 36.322, 3GPP TS 36.323, 3GPP TS 36.331, 3GPP TS 23.303, 3GPP TS 23.401, 3GPP TS 24.301, 3GPP TR 22.885, TS 23.285, ETSI TS 302 637-2, ETSI TS 302 637-3, ETS TR 102 638, and IEEE 1609.12 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

Proximity Services (or ProSe Service or Proximity based Service): a service that enables discovery between physically proximate devices, mutual direct communication through a base station, or communication through the third party device. Here, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a direct communication path.

ProSe Communication path: communication path supporting ProSe Communication. The ProSe E-UTRA Communication path could be established between the ProSe-enabled UEs using E-UTRA, or via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, which uses a common communication path, between more than two ProSe-enabled UEs in proximity.

ProSe UE-to-Network Relay: ProSe-enabled Public Safety UE that acts as a communication relay between a ProSe-enabled UE and the ProSe-enabled network using E-UTRA.

Remote UE: This is a Prose-enabled UE connected to EPC network, i.e. perform communication with a PDN, through Prose UE-to-Network Relay without service from E-UTRAN.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP accessnetwork mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
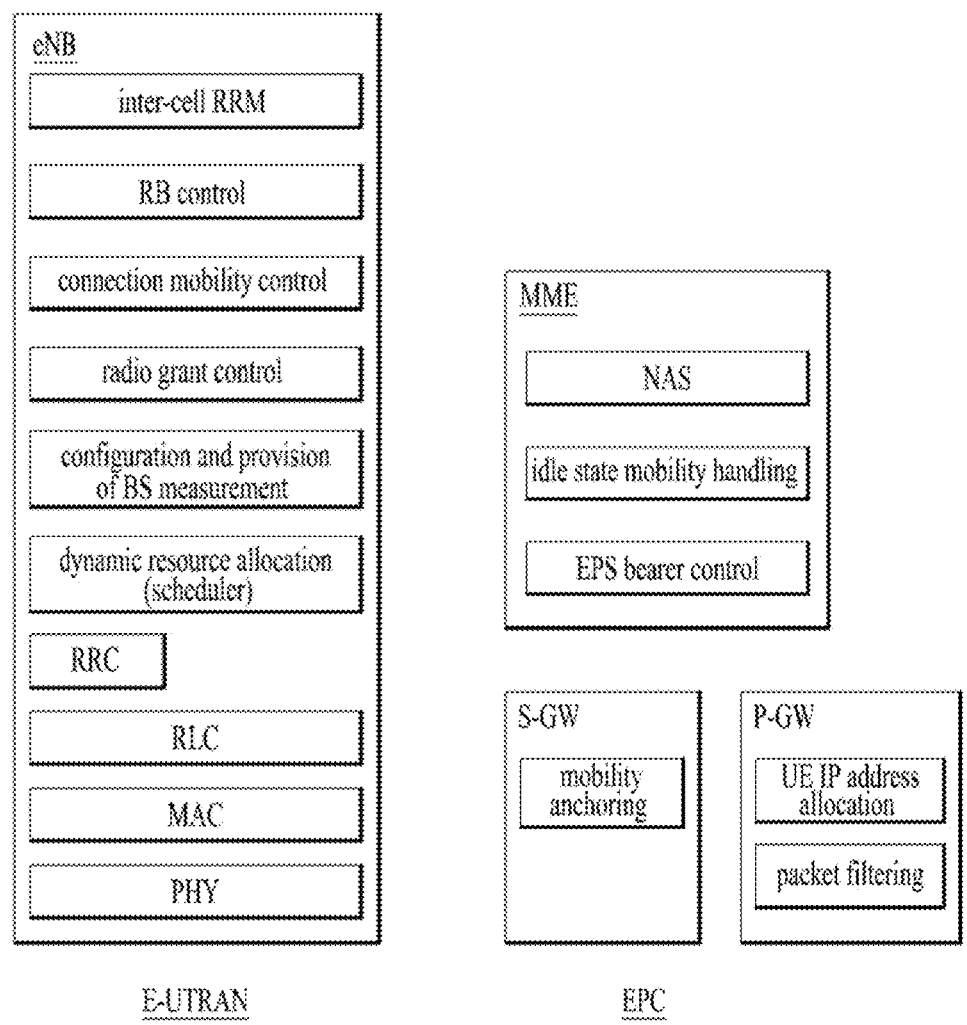
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
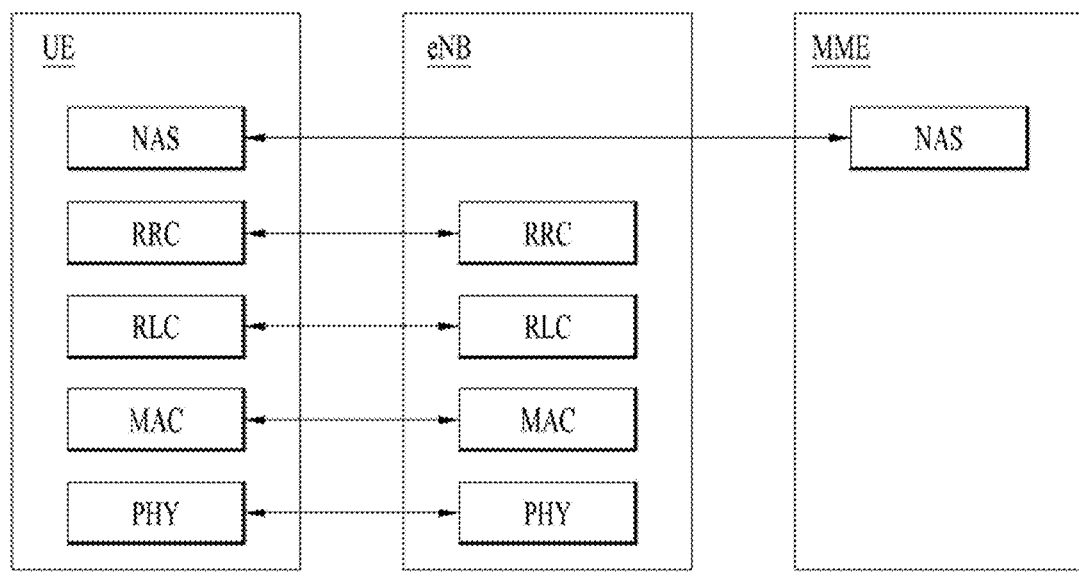
FIG. 3 is a diagram exemplarily illustrating the structure of a radio interface protocol in a control plane.
Figure 4:
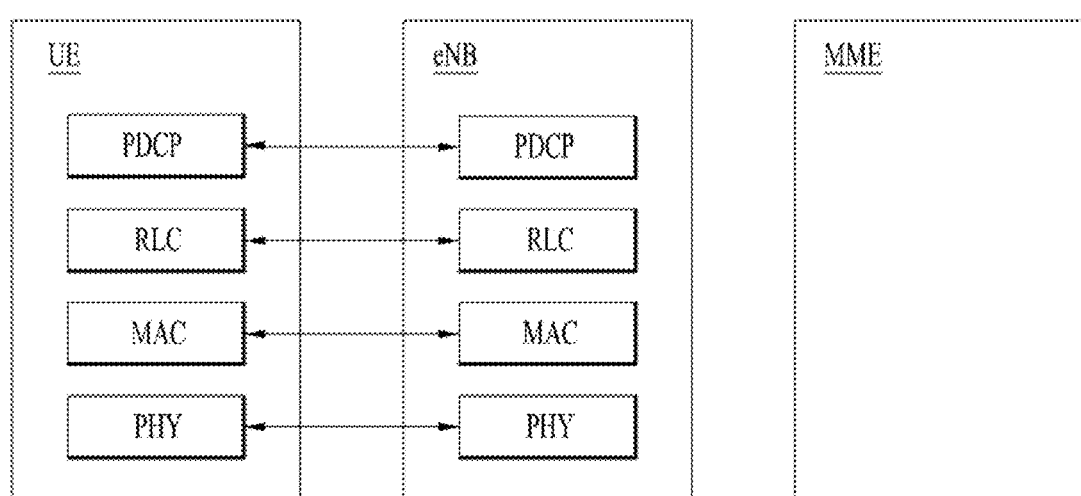
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. Default bearer resources are allocated by a network when a UE initially accesses the network or a specific packet data network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5A:
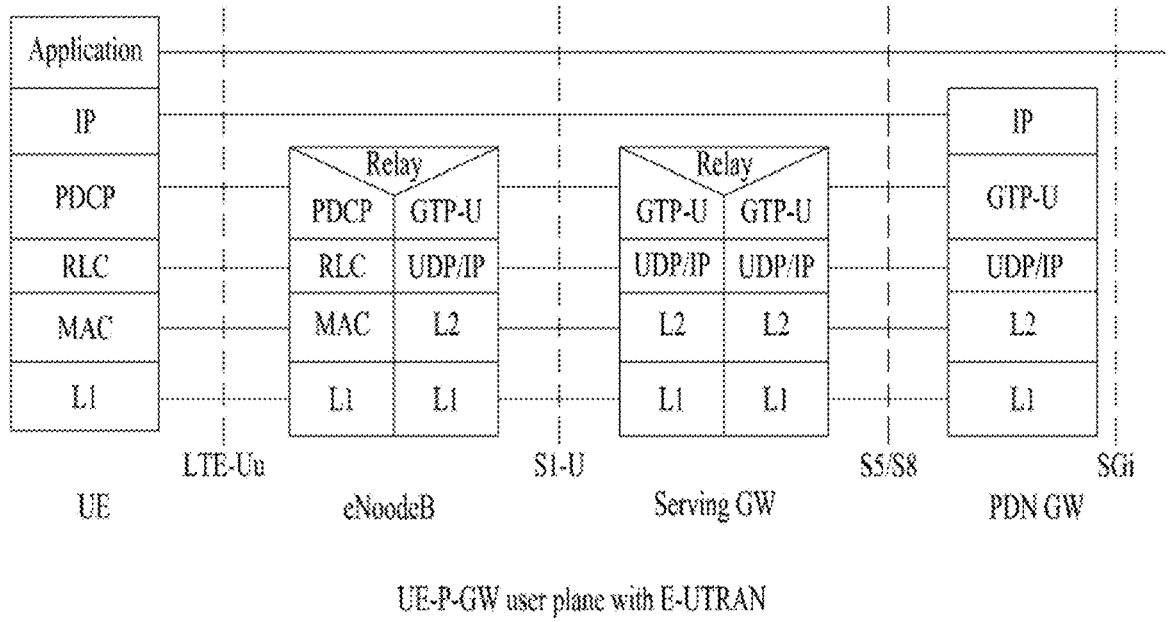
FIGS. 5A and 5B are diagrams illustrating LTE (Long Term Evolution) protocol stacks for a user plane and a control plane.
Figure 5B:
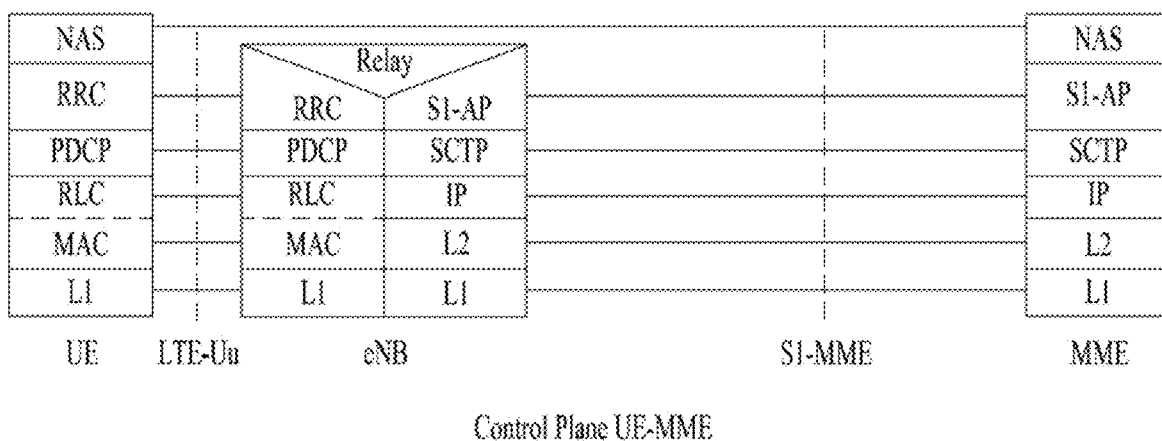

FIGS. 5A and 5B illustrate LTE protocol stacks for a user plane and a control plane. FIG. 5A illustrates user plane protocol stacks over UE-eNB-SGW-PGW-PDN and FIG. 5B illustrates control plane protocol stacks over UE-eNB-MME-SGW-PGW. Functions of key layers of the protocol stacks will now be briefly described below.

Referring to FIG. 5A, a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5B, an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIGS. 5A and 5B.

Figure 6:
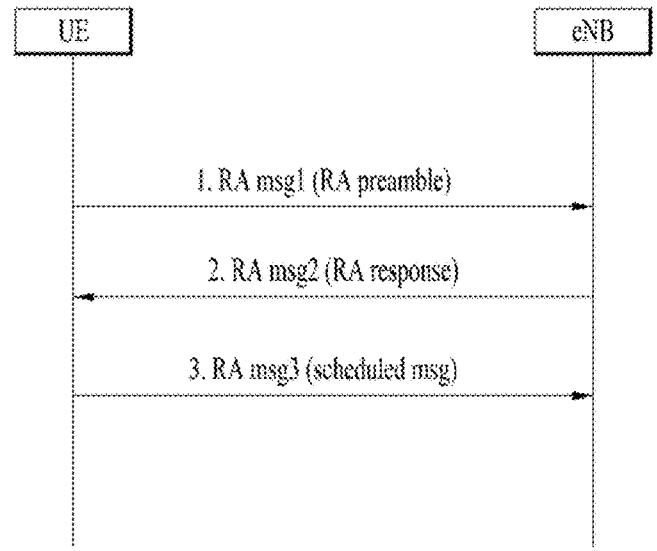
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
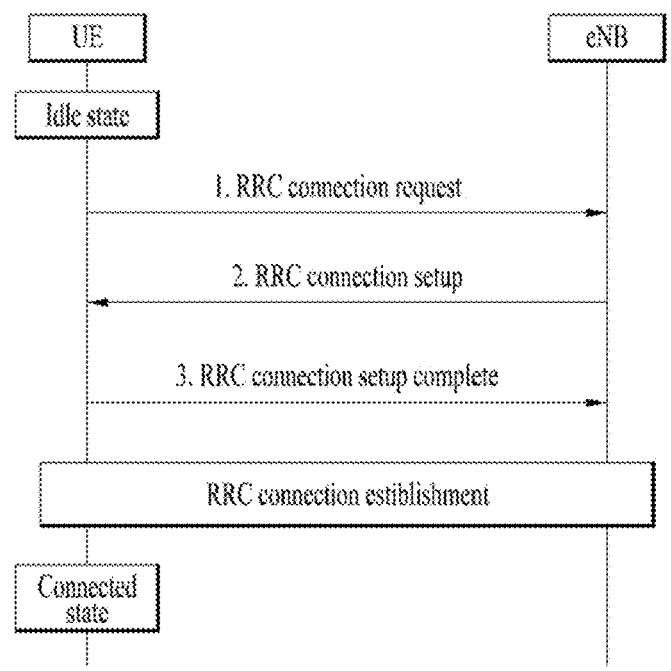
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

Figure 8:
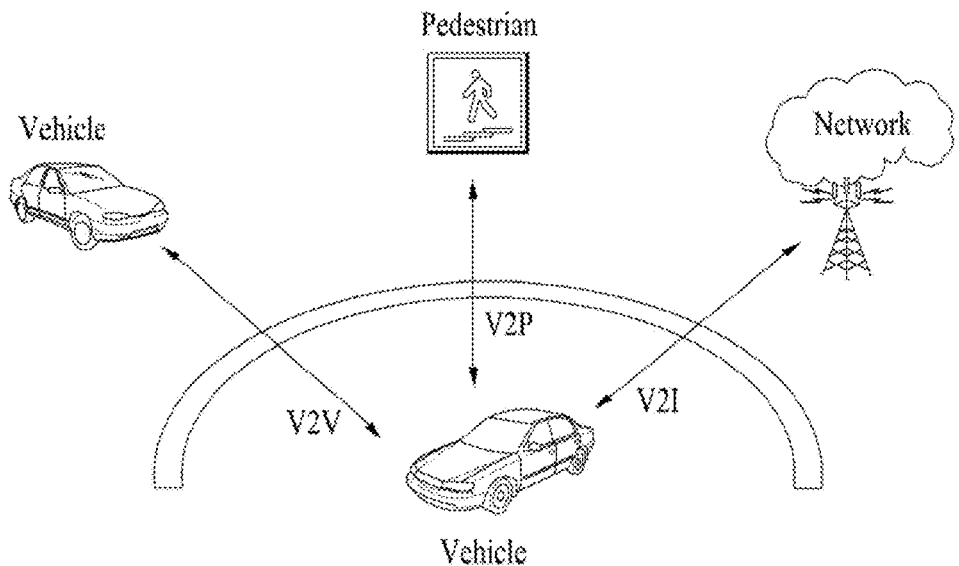
FIG. 8 is a diagram showing a V2X (Vehicle to everything) communication environment.

FIG. 8 is a diagram showing a V2X (Vehicle to everything) communication environment.

When a vehicle accident occurs, considerable injury of human life and property damage may occur. Accordingly, there is a growing demand for a technique for securing safety of a pedestrian as well as safety of a person riding in a vehicle when the vehicle travels. Therefore, vehicle-specific technologies based on hardware and software are being applied to vehicles.

LTE based vehicle-to-everything (V2X) communication technology started in 3GPP also reflects the trend of application of information technology (IT) to vehicles. Connectivity functions are being applied to some vehicle types, and research into support of vehicle-to-vehicle (V2V) communication, vehicle-to-infrastructure (V2I) communication, vehicle-to-pedestrian (V2P) communication and vehicle-to-network (V2N) communication is continuing through evolution of communication functions.

According to V2X communication, the vehicle continuously broadcasts information on the position, speed and direction thereof. Neighboring vehicles, which have received the broadcast information, recognize movement of vehicles therearound to prevent an accident.

That is, each vehicle has a specific UE installed therein, similar to an individual having a terminal such as a smartphone or a smart watch. At this time, the UE installed in the vehicle refers to a device for actually receiving a communication service from a communication network. For example, the UE installed in the vehicle may be connected to an eNB in an E-UTRAN to receive a communication service.

However, there are various considerations in a process of implementing V2X communication in the vehicle, because astronomical costs are required to install traffic safety infrastructure such as V2X eNBs. That is, in order to support V2X communication on all roads where vehicles may move, it is necessary to install several hundred thousand V2X eNBs. In addition, since each network node is connected to the Internet or a central control server using a wired network for stable communication with a server, considerable costs are required to install the wired network.

In an LTE or EPS system, in order to efficiently support V2X, QoS optimized for data generated in a V2X application will be provided.

Figure 9:
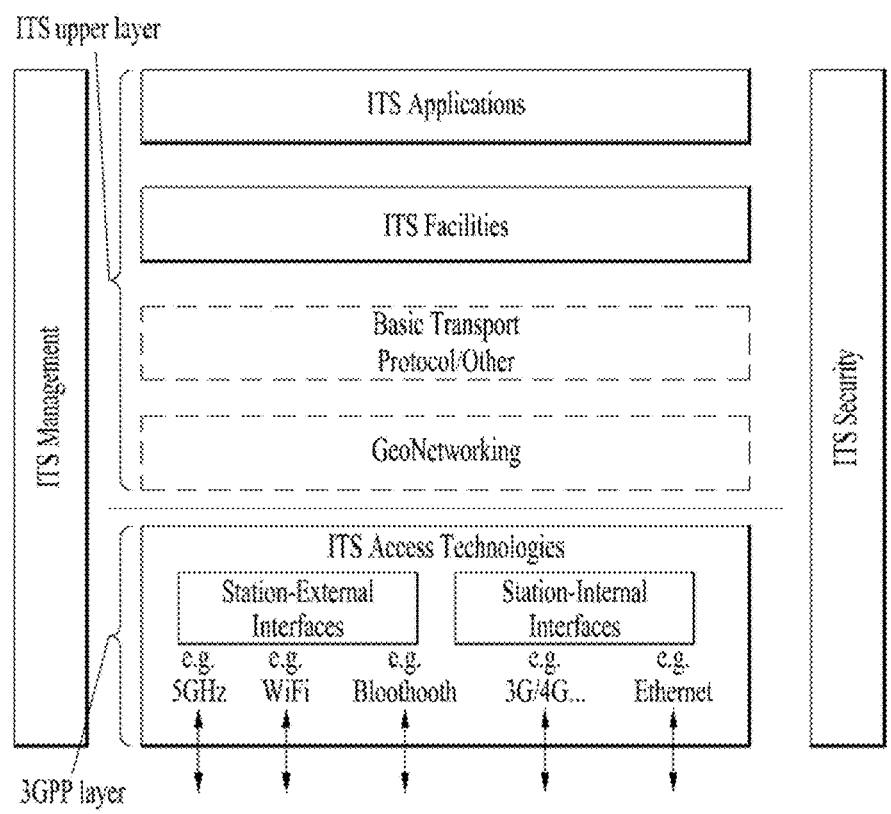
FIG. 9 is a diagram showing an ITS protocol structure established in ETSI ITS.

The V2X application is established in ETSI (European Telecommunications standards Institute) ITS (Intelligent Transport Systems), SAE (System Architecture Evolution), etc. FIG. 9 is a diagram showing an ITS protocol structure established in ETSI ITS.

In FIG. 9, an ITS upper layer refers to all V2X/ITS related layers/protocols existing above a 3GPP layer (e.g., a protocol defined in 3GPP such as PDCP). According to the architecture defined in ETSI ITS, all layers/protocols above ITS access technologies layer correspond to the ITS upper layers.

Since 3GPP is responsible for establishing the communication standard and does not specialize in vehicle operation, 3GPP supports the ITS upper layer defined by the ETSI ITS or SAE without change, and establishes an LTE based V2X function for the purpose of efficiently and stably transmitting data generated by the application.

However, referring to FIG. 9, the ITS upper layer has various protocol layers. Referring to FIG. 9, the ITS upper layer, that is, the V2X protocol stack, includes an ITS applications layer, an ITS facilities layer, a basic transport protocol/other layer, and a geonetworking layer. In addition, when the ETSI ITS or SAE defined the V2X related protocol stack, LTE did not support the V2X function. From the viewpoint of the 3GPP layer, the data from the ITS upper layer is recognized as V2X data, that is, ITS data, regardless of in which sublayer of the ITS upper layer the data is generated or through which sublayer the data reaches the 3GPP layer. In other words, according to the current standards, the 3GPP layer cannot distinguish between sublayers of the ITS upper layer and recognize the entire ITS upper layer as the V2X upper layer, that is, the ITS upper layer. For example, the 3GPP layer recognizes messages from the upper layer of the ITS access technologies layer as messages from one V2X layer.

In the present invention, V2X and ITS are generally used interchangeably, except when referring to the "ITS application" layer/protocol which is the sublayer of the ITS upper layer. For example, the ITS upper layer, the ITS application, the ITS data and the ITS protocol are respectively referred to as a V2X upper layer, a V2X application, V2X data and a V2X protocol. In the present invention, the V2X application does not correspond one-to-one to the ITS application. In the present invention, the application/protocol of the ITS applications layer, the application/protocol of the ITS facilities layer, the application/protocol of the basic transport protocol/other layer or the application/protocol of the geonetworking layer may become a V2X application. In the proposals of the present invention, the expression "ITS application", which is not specified as the "ITS applications layer" is used interchangeably with the V2X application. Accordingly, V2X application is not limited to the application/protocol of the ITS applications layer.

Accordingly, when the V2X upper layer of ETSI ITS or SAE is linked to the V2X function supported by 3GPP, different UEs may not properly interwork according to implementation. For example, data generated in the ITS facilities layer may be provided to the 3GPP transmission function in one implementation and data generated in the ITS applications layer may be provided to the 3GPP transmission function in another implementation. In this case, the 3GPP layer fails to process the data received from the other implementations and thus cannot achieve the intended purpose of traffic safety. For example, 3GPP roughly defines two modes in order to support V2X communication between vehicles.

A first V2X mode is a direct mode in which vehicles directly exchange V2X related information. In the first V2X mode, for example, a PC5 interface is used.

A second V2X mode is an indirect mode in which vehicles do not directly exchange V2X related information but exchange data through a network. For example, one vehicle transmits V2X information thereof to the network and the network transmits the V2X information received from the vehicle to another vehicle. In the second V2X mode, a Uu interface is used.

Currently, vehicle manufacturers are attempting to implement 3GPP based V2X functions in vehicles thereof. However, the purpose of implementation may differ between vehicle manufacturers, and a method of supporting communication between vehicles may differ between mobile communication providers, to which vehicles subscribe. For example, the following two cases may be considered.

Vehicle manufacturer A: Since various functions cannot be added in order to produce low-cost vehicles, only the first V2X mode is supported.

Vehicle manufacturer B: In order to support various V2X applications using a server, both the first mode and the second mode are supported.

In the case of the vehicle manufacturer A, only a simple V2X application is provided and thus there is no V2X application requiring a function for communicating with a server. In this case, it is unnecessary to provide an IP necessary to communicate with the server. In addition, in order to increase data transmission efficiency in PC5, the vehicle manufacturer A may decide to transmit non-IP type V2X data to the 3GPP layer.

In the case of the vehicle manufacturer B, when it is assumed that communication with the server is performed, an IP should be implemented for communication with the server. At this time, in the case where whether the IP is used or not is determined depending on whether the first V2X mode or the second V2X mode is used, data loss may occur in interruption occurring during switching between use and non-use of the IP. Therefore, the vehicle manufacturer B decides to always apply the IP to the V2X data.

The two vehicle manufacturers made the best choices. Nevertheless, communication between the two vehicles should be supported for safety. However, if there is no data on the data format included in the received PDCP PDU, that is, information indicating whether IP is applied or not, the received PDU may not be correctly decoded.

Figure 10:
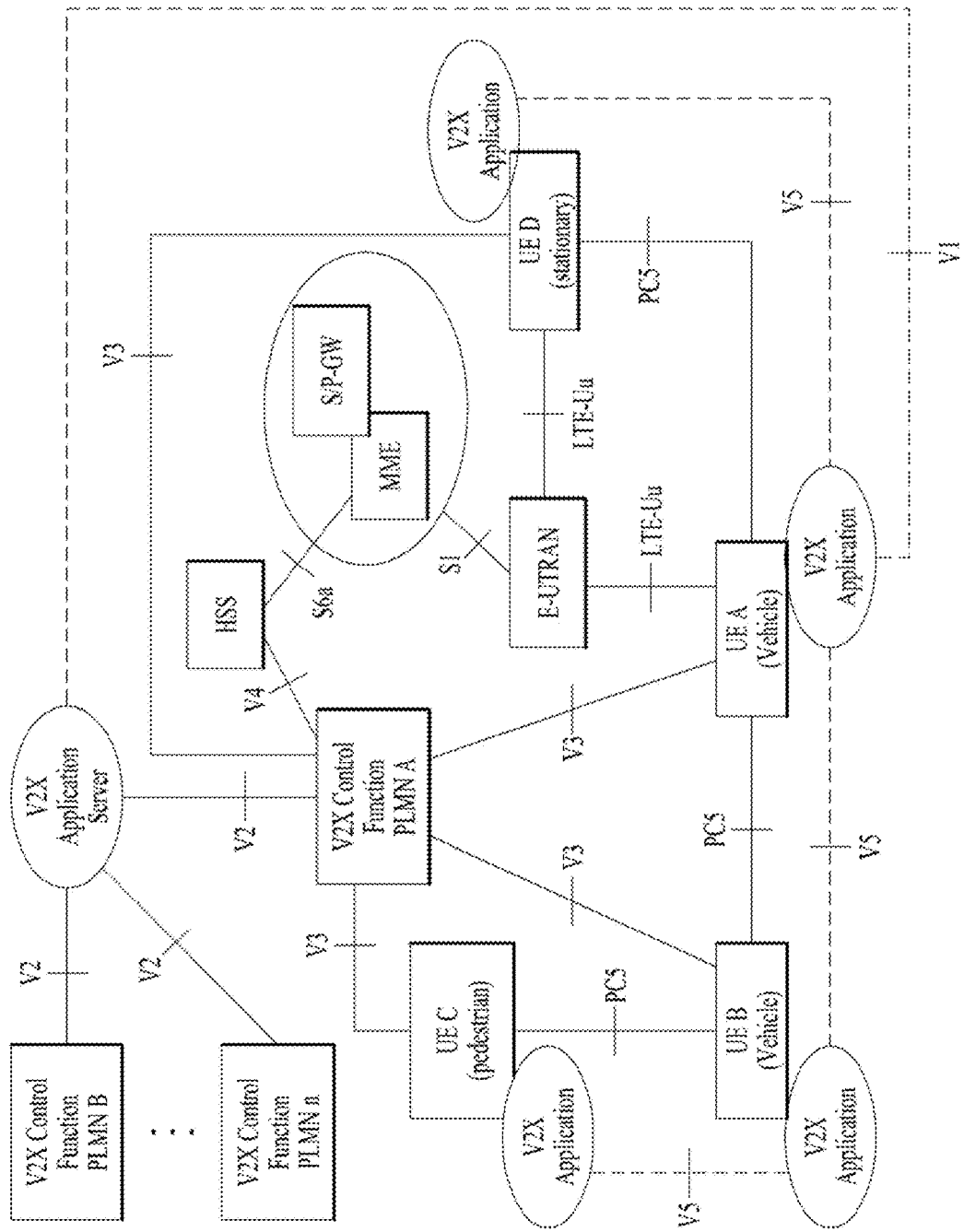
FIG. 10 is a diagram showing a network structure implemented in a 3GPP based V2X system.

FIG. 10 is a diagram showing a network structure implemented in a 3GPP based V2X system.

Referring to FIG. 10, data generated at a V2X application is transmitted to a V2X application server through an E-UTRAN. However, when the eNB corresponding to the E-UTRAN does not accurately determine whether or not the data received from the UE includes IP information or in which ITS protocol layer the data is finally generated, the protocol format of the ITS upper layer is arbitrarily applied. Accordingly, messages to be transmitted to the V2X application server or the V2X control function may be deleted or decoding errors may be generated.

There are various types of V2X applications and each V2X application may use various types of messages. Messages having similar properties are bundled to form one message set and examples of the message set include a BSM (Basic Safety Message), a CAM (Co-operative Awareness message), a DENM (Decentralized Environmental Notification Message), etc.

IEEE 1609.12 allocates IDs to V2X applications (see 1609 PSID page at "IEEE Standards Association Registration Authority" website). Table 2 shows some of PSDIs allocated according to IEEE 1602.12.

TABLE 2

| PSID values (hex) | P-encoded PSID values (hex) | Application area | Organization/ Documentation | Number of values (decimal) |
|---|---|---|---|---|
| 0x00 | 0p00 | system | ISO 15628[a] | 1 |
| ... | ... | ... | ... | ... |
| 0x20 | 0p20 | vehicle to vehicle safety and awareness | SAE J2735 | 1 |
| 0x21 | 0p21 | tracked vehicle safety an awareness | SAE J2735 | 1 |
| ... | ... | ... | ... | ... |
| 0x82 | 0p80-02 | intersection safety and awareness | SAE J2735 | 1 |
| 0x83 | 0p80-03 | traveller information and roadside signage | SAE J2735 | 1 |
| 0x84 | 0p80-04 | mobile probe exchanges | SAE J2735 | 1 |
| 0x85 | 0p80-05 | emergency and erratic vehicles present in roadway | SAE J2735 | 1 |
| ... | ... | ... | ... | ... |
| 0x40-80 | 0pC0-00-00 | Cooperative Awareness Message (CAM) processor (deprecated) | ETSI | 1 |
| 0x40-81 | 0pC0-00-01 | Decentralized Environmental Notification Message (DENM) processor (deprecated) | ETSI | 1 |
| ... | ... | ... | ... | ... |

In each use case or when an application finds a certain situation, each vendor transmits a message according to the situation using a message set considered as being appropriate thereby.

In ETSI, various use cases and V2X messages related to ITS are being defined. For example, ETSI ITS defines CAM-type messages, DENM type messages and use cases thereof. For example, ETSI ITS CAM-type messages may be used in use cases corresponding to categories of "Vehicle type warnings", "Dynamic vehicle warnings", "Collision Risk Warning" and "Others". In the use cases of "Vehicle type warnings" category, there are "Emergency Vehicle Warning", "Slow Vehicle Indication", "Motorcycle Approaching Indication", "Vulnerable road user Warning", etc. In the use cases of "Dynamic vehicle warnings" category, there are "Overtaking vehicle warning", "Lane change assistance", "Co-operative glare reduction", etc. In the use cases of the "Collision Risk Warning" category, there are "Across traffic turn collision risk warning", "Merging Traffic Turn Collision Risk Warning", "Co-operative merging assistance", "Intersection Collision Warning", "Traffic light optimal speed advisory", "Traffic information and recommended itinerary", "Enhanced route guidance and navigation (RSU Capability)", "Intersection management", "Co-operative flexible lane change", "Limited access warning, detour notification", etc. In the use cases of the "Others" category, there are "Point of interest notification", "Automatic access control/parking access", "Local electronic commerce", "Car rental/sharing assignment/reporting", "Media downloading", "Map download and update", etc. Meanwhile, the DENM type messages may be used in the use cases corresponding to categories of the "Vehicle status warnings" and "Traffic hazard warnings". In the use cases of "Vehicle status warnings" category, there are "Emergency electronic brake lights" and "Safety function out of normal condition warning". In the use cases of "Traffic hazard warnings" category, there are "Wrong way driving warning", "Stationary vehicle warning", "Signal violation warning", "Roadwork warning", "Collision Risk Warning from RSU", etc. For details thereof, refer to ETSI TS 302 637-2, ETSI TS 302 637-3, and ETS TR 102 638.

The V2X message should be received by all UEs in a region (range) in which the message is valid from the viewpoint of road safety. Therefore, a broadcast transmission method such as MBMS (Multimedia Broadcast Multicast Services) or SC-PTM (Single-cell Point-to-Multipoint) may be used to transmit the V2X message.

A basic message supporting V2X applications, that is, a message preferentially implemented for traffic safety, includes a CAM/DENM/BSM (Basic Safety Message). In particular, the CAM/DENM corresponds to the facilities layer in the protocol defined in ETSI ITS and the lower layer of the facilities layer further includes a geonetworking layer and ITS G5. In ETSI, the protocol for communication between vehicles has been established through an ITS standardization group for a long time. The ETSI ITS defined up to each application and a lower layer, an actual physical layer. When the data of the ITS applications layer or the data of the ITS facilities layer passes through the basic transport protocol (BTS) or geonetworking layer, the IP type data having an IP header is transferred to an ITS access technologies layer and, when the data of the ITS applications layer or the data of the ITS facilities layer does not pass through the basic transport protocol (BTS) or geonetworking layer, a non-IP type data without an IP header is transferred to the ITS access technologies layer. According to ETSI ITS, the CAM/DENM is transferred to the ITS access technologies layer without passing through the BTS and the geonetworking layer. That is, according to ETSI ITS, a basic transport protocol (BTP) layer and a geonetworking layer are used to transport the CAM/DENM and IP/UDP/TCP is not used to transport the CAM/DENM.

In V2X related LTE standardization starting from 2015, since 3GPP is composed of communication experts but is not composed of traffic safety experts, among various protocols of the ITS upper layers, layers above the ITS access technologies layer, were not standardized but only a communication system optimally supporting the ITS upper layers was standardized. Accordingly, 3GPP is developing a communication system for optimally transmitting messages such as CAM/DENM. However, the LTE V2X protocol which is being developed in 3GPP is based on an EPS and the EPS is a system for exchanging IP data. Accordingly, in a V2X mode in which data is transferred through a network, the EPS cannot support non-IP data. However, according to the CAM/DENM based V2X protocol defined in ETSI ITS, when the CAM/DENM is transferred to the ITS access technologies layer, the CAM/DENM is transferred in the form of the non-IP data without the IP header. Accordingly, currently, in the LTE based communication system, for example, when the CAM/DENM of indirect communication between vehicles through the network takes a non-IP form, the CAM/DENM cannot be properly transferred between the vehicles and thus the ITS upper layer established in ETSI ITS cannot be properly supported. In order to solve such a problem, the following options may be considered.

- Option 1: ITS application layer messages are directly pushed into 3GPP transport. That is, CAM, DENM and BSM are directly exchanged between the ITS application layer and the 3GPP system. In this case, the messages generated in the ITS applications layer skip the ITS facilities layer/protocol and/or the geonetworking layer/protocol and are directly transferred to the 3GPP layer, for example, the PDCP layer of 3GPP.
- Option 2: Messages from the ITS application, that is, the V2X application, are aligned to the message type expected by 3GPP. For example, ITS safety messages are encapsulated in IP/TCP/UDP before being transferred from the ITS upper layer to the 3GPP layer.

However, such options cause other problems. For example, vehicles which may be connected to the Internet by installing communication modules will increase in the future and the vehicles connected to the Internet will use web browsing and music streaming services. This means that the vehicles connected to the Internet should perform IP based communication. In addition, the examples of another V2X service may include navigation. Navigation is also based on IP. Accordingly, if Option 1 is used, an Internet based service cannot be received. If Option 2 is used, an IP header is attached whenever the CAM/DENM is transmitted. When wireless transmission is performed based on the IP header, there is a problem that radio resources are continuously consumed.

Figure 11:
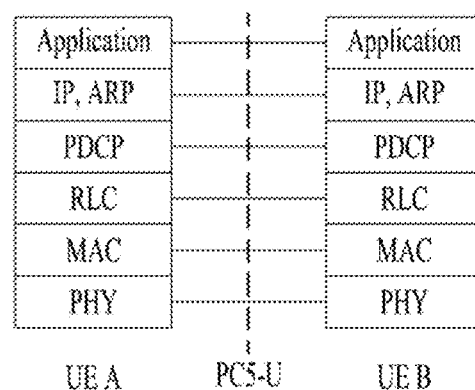
FIG. 11 is a diagram showing a user plane protocol stack used in ProSe communication.

Meanwhile, FIG. 11 is a diagram showing a user plane protocol stack used in ProSe communication (see 3GPP TS 23.303). In the case of one-to-all Prose direct communication for V2X message transmission/reception for V2V/P services using PC5, PC5-U may be used. PC5-U is expected to be used to transmit/receive non-IP type V2X messages through a PC5 interface. That is, since ProSe uses direct communication between a UE and a UE and passes through a network node, an IP may be configured not to be used when direct communication between the UE and the UE is performed. However, due to congestion of the communication network, when the V2X message is transmitted to the network node instead of direct communication between the UE and the UE, the IP should be used for communication. Accordingly, restricting the ITS application to one of Option 1 and Option 2 is not a suitable solution for LTE-based V2X communication.

Accordingly, the present invention proposes a method of solving a problem that, when the ITS upper layer requests data transmission from a 3GPP stack, the 3GPP stack/layer does not know whether the data is IP data or non-IP data. Specifically, the present invention proposes a method of efficiently processing the data of the ITS upper layer to support various protocols defined for a variety of V2X in a mobile communication system. In addition, a method of efficiently supporting IP-type data and non-IP-type data in a mobile communication system supporting communication between vehicles is proposed.

In addition, the present invention proposes a method of enabling a 3GPP stack/layer to perform different processing according to the type of the data generated at an ITS/V2X upper layer.

Proposals 1-1 and 1-2 of the present invention relate to methods of solving a problem that a 3GPP layer does not know whether requested V2X data is IP data or non-IP data. Proposal 2 of the present invention relates to a method of enabling a 3GPP layer to discriminate the type of requested V2X data. Proposal 2 of the present invention is applicable together with Proposal 1-1 or Proposal 1-2.

Proposal 1-1: ITS Upper Layer Notifies 3GPP Layer of Whether ITS/V2X Data is IP or Non-IP Data Proposal 1-1 of the present invention proposes that, when the ITS upper layer or the V2X upper layer requests the 3GPP stack to transmit data, it is necessary to inform the 3GPP stack of to which protocol layer the data corresponds. Proposal 1-1 of the present invention proposes that when the entity of the upper layer of the 3GPP stack transmits a data unit including the data through 3GPP radio, to which protocol entity the data of the data unit corresponds is included in the data unit. Examples of Proposal 1-1 of the present invention will now be described.

The data generated at the ITS upper layer of the transmission side is transferred to the PDCP entity. The ITS upper layer may transfer, to the PDCP entity, information indicating at which protocol the data is generated. The ITS upper layer may transfer, to the PDCP entity, information on to which protocol the data of the data unit corresponds. For example, the information indicates whether the data is BTP data, geonetworking protocol data, CAM protocol data, DENM protocol data, or other protocol data of the ITS. As another example, the information indicates whether the data is generated at the BTP, the geonetworking protocol, the CAM protocol, the DENM protocol or other protocols of the ITS. In particular, the ITS upper layer may notify the PDCP entity of whether the data is IP data or not. Alternatively, information indicating whether the data is generated at the IP may be transferred. The information may be provided to the PDCP data whenever the data is transferred to the PDCP entity and may be preset semi-fixedly.

The PDCP entity of the transmission side constructs a PDCP protocol data unit (PDU) using data transferred thereto by the ITS upper layer and transfers the PDCP PDU to a lower layer. PDCP PDUs are classified into a PDCP control PDU and a PDCP data PDU. The PDCP control PDU is used to convey a PDCP status report indicating that PDCP service data units (SDUs) are missed and do not follow PDCP re-establishment, or header compression control information (e.g., interspersed ROHC feedback). The PDCP data PDU is used to convey: a PDCP SDU sequence number (SN); and for sidelink radio bearers (SLRBs) used for one-to-many communication, a PGK (ProSe Group Key) index, a PTK (ProSe Traffic Key) index and an SDU type; or for SLRBs used for one-to-one communication, a $K_{D\text{-}sess}$ identifier and an SDU type; and user plan data containing an uncompressed PDCP SDU; or user plan data containing a compressed PDCP SDU and control plan data; and a MAC-I field for signaling radio bearers (SRBs); or for SLRB requiring integrity protection for one-to-many communication, a MAC-I field; for a relay node (RN), a MAC-I field for a data radio bearer (if integrity protection is established).

The PDCP PDU generated by the PDCP entity and transferred to the lower layer according to the present invention may include the following information:

PDCP PDU data type indicator; or

ITS data type indicator.

The indicator may indicate in which protocol the data included in the PDCP PDU is generated or the type of the data. For example, the indicator indicates whether the data is BTP data, geonetworking protocol data, CAM protocol data, DENM protocol data or other protocol data of the ITS. As another example, the indicator indicates whether the data is generated in the BTS protocol, the geonetworking protocol, the CAM protocol, the DENM protocol or other protocols of the ITS.

The ITS upper layer may inform the PDCP entity of whether the data is IP data or not and the PDCP entity may appropriately set and include a PDCP PDU or ITS data type indicator in the PDCP PDU.

The PDCP entity of the reception side according to the present invention may handle the PDCP PDU received from the lower layer as follows. The PDCP entity may check the header of the received PDCP PDU and discriminate which protocol data is included or in which protocol the data is generated. The discrimination process may use the following information included in the PDCP PDU header:

PDCP PDU data type indicator; or

ITS data type indicator.

The indicator may indicate at which protocol of the ITS upper layer the data included in the PDCP PDU is generated or the type of the data. For example, the indicator indicates whether the data is BTP data, geonetworking protocol data, CAM protocol data, DENM protocol data or other protocol data of the ITS. As another example, the indicator indicates whether the data is generated at the BTS, the geonetworking protocol, the CAM protocol, the DENM protocol or other protocols of the ITS.

In the case of the transmission side, the ITS upper layer notifies the PDCP entity of whether the data is IP data or not.

The PDCP entity of the reception side may also transfer information indicating which protocol data is transferred or at which protocol the data is processed when the data included in the PDCP PDU is transferred to the ITS upper layer.

The ITS upper layer of the reception side may process the data received from the PDCP entity as follows. The ITS upper layer of the reception side checks the information received from the PDCP entity together with the data, that is, which protocol data is transferred or to which protocol the data is related and processes the data according to the standard of the corresponding protocol or transfer the data to the corresponding protocol. For example, if the data is indicated as IP data, the data is transferred to the IP. If the data is not indicated as IP data, an IP header is regarded as being absent and the data is processed. For example, if the data is indicated as CAM protocol data, the data is transferred to the CAM protocol entity.

Each entity may be preconfigured how to process which data. For example, the system may instruct a certain PDCP entity to process only data generated at the BTP. In this case, the PDCP entity requests the lower entity to transmit data or transfers the data to the upper entity, only when the data transmitted or received thereby is BTP data. In this case, the PDCP entity does not request the lower entity to transmit data or does not transfer the data to the upper entity, when the data transmitted or received thereby is not BTP data. Then, the data is deleted.

Proposal 1-2: Network Indicates Whether or Not IP Header is Attached

In Proposal 1-2 of the present invention, in transmission/reception of V2X messages, an LTE based communication protocol indicates whether an IP header is necessary or not with respect to which V2X message, and the V2X upper layer may or may not attach the IP header to the V2X message.

In Proposal 1-1, whether or not the IP header is attached to the ITS data, that is, V2X data is an implementation problem of the ITS upper layer. That is, Proposal 1-1 relates to a method of discriminating between the IP-type ITS data and the non-IP-type ITS data at the 3GPP layer, that is, the communication system, on the assumption that the ITS data is of IP type or non-IP type. In contrast, in Proposal 1-2, the network notifies the UE of whether or not the IP header is attached to the ITS data.

Next, a procedure of transmitting/receiving a V2X message through a Uu interface at a UE, which has transmitted/received a V2X message using a PC5 interface to/from a certain UE using only a CAM/DEMN related application according to Proposal 1-2 of the present invention will be described. For example, the UE, which has generated the CAM/DENM type message without the IP header through PC5 interface communication, may transmit the IP header together with the CAM/DENM type message using the Uu interface.

Figure 12:
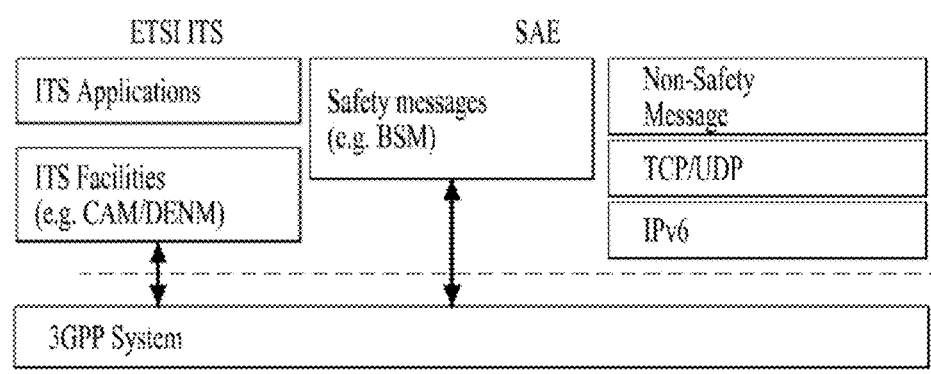
FIG. 12 is a diagram showing a protocol stack available in V2X communication.

FIG. 12 is a diagram showing a protocol stack available in V2X communication. In FIG. 12, as a safety message, there may be a collision prevention message and, as a non-safety message, there may be a message which is not related to collision prevention, such as map downloading.

The UE may transmit the V2X message through PC5 while maintaining the protocol stack of FIG. 12. Thereafter, the network may instruct the UE to stop message transmission through PC5 and to perform V2X message transmission through Uu. For example, each eNB may indicate change of system information including V2X control information in a cell. For details of change of system information transmitted in the cell, refer to section 5.2 of 3GPP TS 36.331. Through the changed system information, the UE may receive new V2X related system information. The V2X related system information may include V2X connection mode information indicating whether a PC5 (sidelink) interface or a Uu interface is used for the UE to use the V2X application.

If the V2X connection mode information indicates use of Uu, when the UE has not established an RRC connection with the eNB, the UE performs an RRC connection establishment procedure with the eNB. In the RRC connection establishment procedure, a service request procedure (see section 5.3.4 of 3GPP TS 23.401) is performed. In the service request procedure, the UE may transmit information indicating which V2X application is currently being used in the service request message.

For example, in a UE triggered service request procedure, the UE sends a service request message which is an NAS message toward a mobility management entity (MME) encapsulated into an RRC message to the eNB. According to the present invention, the service request message may include whether the UE is using a V2X application, and V2X applications used by the UE if the UE is using the V2X application.

The MME, which has received the service request, sends an S1-AP initial context setup request message (including serving GW address, S1-TEID(s) (UL), EPS bearer QoS(s), security context, MME signaling connection ID, handover restriction list, and CSG membership indication) to the eNB. In this step, radio and S1 bearers for all active EPS bearers are activated. The eNB stores security context, MME signaling connection ID, EPS bearer QoS(s) and S1-TEID(s) in UE RAN context. At this time, the network node (e.g., MME and/or eNB) may provide the following configuration information to the UE:

which V2X application is allowed to be used by the UE;
which EPS bearer or radio bearer is used to transfer the data for the corresponding V2X application with respect to the allowed V2X application;
whether the ITS upper layer adds the IP header to the messages for the corresponding V2X application (or the IP is used in the messages for the corresponding V2X application) with respect to the allowed V2X application;
whether the PDCP layer, which has received the messages generated at the ITS upper layer, adds the IP header to the received messages with respect to the allowed V2X application; or
whether the IP header/protocol is used with respect to each DRB or EPS bearer.

When the configuration information is received, the UE applies the configuration information as intended by the configuration information.

The configuration information may be transferred in a process of configuring an EPS bearer. Referring to "Figure 5.4.2.1-1" of Section 5.4.2 of 3GPP TS 23.401 showing a PDN GW for GTP based S5/S8, that is, a P-GW initiated bearer modification procedure, before the P-GW initiated bearer modification procedure is used, in step 0, the UE may notify to the network (e.g., MME) of a list of active V2X applications using a UE information procedure such as request bearer resource modification (see Section 5.4.5 of 3GPP TS 23.401) or another procedure. When the bearer resource modification request of the UE is accepted, the P-GW initiated bearer modification procedure is invoked. The P-GW initiated bearer modification procedure is used to modify one or more of EPS QoS parameters such as QCI (QoS Class Identifier), GBR (Guaranteed Bit Rate), MBR (Maximum Bit Rate) or ARP (Allocation and Retention Priority) or APN-AMBR (per APN Aggregated Maximum Bit Rate). Here, QCI is used as a reference for accessing node-specific parameters for controlling bearer level packet forwarding treatment (e.g., scheduling weight, admission threshold, queue management threshold, link layer protocol configuration, etc.) and is scalar value preconfigured by an operator of the eNB. The ARP is used to determine whether the bearer establishment/modification request is accepted or rejected in the case of resource limitation. The ARP may be used by the eNB to determine which bearer(s) are dropped during exceptional resource restrictions (e.g., handover).

The MME builds and sends, to the eNB, a session management request including PTI (Procedure Transaction Id), EPS bearer QoS parameters (excluding ARP), TFT (Traffic Flow Template), APN-AMBR, EPS bearer identifier and WLAN offloadability indication (see step 4 of "Figure 5.4.2.1-1" of 3PP TS 23.401). If the UE has an active V2X application, the MME indicates which V2X application uses which EPS bearer with respect to each EPS bearer. In addition, the MME may include information indicating whether the EPS bearer should transmit non-IP data or IP data in the session management request with respect to each EPS bearer. In this step, the network node (e.g., MME or eNB) may provide the following configuration information to the UE:

which V2X application is allowed to be used by the UE;
which EPS bearer or radio bearer is used to transfer the data for the corresponding V2X application with respect to the allowed V2X application;
whether the ITS upper layer adds the IP header to the messages for the corresponding V2X application (or the IP is used in the V2X application) with respect to the allowed V2X application;
whether the PDCP layer, which has received the messages for the corresponding V2X application, adds the IP header to the corresponding V2X messages with respect to the allowed V2X application (or whether the IP should be used with respect to the data for the corresponding V2X application); or
whether the IP header/protocol is used with respect to each DRB or EPS bearer.

When the configuration information is received, the UE applies the configuration information as intended by the configuration information.

Proposal 2: Discrimination of V2X Data Type at 3GPP Layer

As described above, basically, an LTE system, that is, an EPS system, is based on IP communication. Accordingly, if there is no special condition, the LTE system, that is, the EPS system, is responsible for transmission of IP packets. However, in the case of ProSe, a small group of UEs may perform direct communication and there may be no entity for performing central coordination. Accordingly, in ProSe communication, when IP based communication is performed, each UE selects an IP address used thereby. To this end, in some cases, there may be UEs having the same IP address among UEs for performing ProSe communication. In order to prevent this problem, a PDCP for ProSe supports not only IP but also an address resolution protocol (ARP). ARP is used to map IP network addresses to hardware addresses used by a data link protocol. In addition, a PC5 signaling (PC5-S) protocol was also defined in order for UEs located outside an eNB to exchange signaling for controlling ProSe related parameters. The PC5-S protocol is used for control plane signaling (e.g., establishment, maintenance and release of secure layer-2 link on PC5, TMGI monitoring requests, cell ID announcement requests, etc.). To this end, in order to discriminate between different data, the SDU type of the PDCP header supports values indicating IP, PC5-S, ARP, etc. In order to prevent overhead and efficiency degradation from being generated on a radio interface as the PDCP header becomes larger, the SDU type was limited to 3 bits. The following table shows an SDU-type field according to the current 3GPP TS 36.323 standard. The SDU-type field is located at the PDCP header and is used to discriminate among IP, ARP and PCG signaling.

TABLE 3

| Bit | Description |
| --- | --- |
| 000 | IP |
| 001 | ARP |
| 010 | PC5 Signaling |
| 011-111 | reserved |

The PDCP entity may differently handle the SDU according to SDU type. For example, header compression may be applied to an IP SDU and may not be applied to ARP SDU.

There are already 20 to 30 ITS applications, that is, a V2X applications, and message sets related thereto. Supporting V2X in LTE means that the LTE system supports the ITS applications and the message sets related thereto. Basically, LTE V2X is expected to be based on ProSe communication and thus to follow the above-described PDCP SDU format. That is, ITS applications are expected to be discriminated using the SDU type information included in the header of the PDCP PDU. However, as shown in Table 3, up to a total of eight SDU types may be discriminated by SDU type field and, since the number of values capable of being allocated additionally is currently only 5, the current PDCP PDU structure has a limitation in supporting many ITS applications.

Accordingly, Proposal 2 of the present invention proposes a method of efficiently supporting various ITS applications or message sets at a PDCP layer. Even when Proposals 1-1 and 1-2 of the present invention are applied, since a method of discriminating among ITS applications or message sets is necessary, Proposal 2 is applicable together with Proposal 1-1 or 1-2.

Proposal 2-1

Proposal 2-1 of the present invention proposes notifying whether or not a PDCP SDU included in a PDCP PDU is for ITS using an SDU-type field included in a PDCP PDU header. Implementations according to Proposal 2-2 of the present invention will now be described.

Table 3 may be modified as follows according to Proposal 2-1 of the present invention.

SDU Type length: 3 bits
PDCP SDU type, that is, layer-3 protocol data unit type. The PDCP entity may differently handle an SDU according to SDU type. For example, header compression may be applied to an IP SDU and may not be applied to ARP SDU.

TABLE 4

| Bit | Description |
| --- | --- |
| 000 | IP |
| 001 | ARP |
| 010 | PC5 Signaling |
| 011 | ITS Application Data |
| 100-111 | reserved |

When a transmission side transmits ITS application data, that is, V2X data, the SDU type of the PDCP PDU header is set to 011 and the V2X data is included and transmitted in a PDCP PDU. When a reception side receives the PDCP PDU, the header of the PDCP PDU is checked. When the value of the SDU-type field of the PDCP PDU header is 011, the PDCP SDU included in the PDCP PDU is regarded as ITS data and the data is transferred to the ITS application, that is, the V2X application, of the reception side.

In Table 4, 011 is one example and another value such as 100, 101, 110 or 110 may be designated as a value indicating ITS application data.

Since one or more ITS/V2X applications or ITS protocols may be used in a UE, when the SDU type indicates an ITS/V2X application, it may be necessary to further determine to which ITS/V2X application ITS data included in the SDU corresponds. Therefore, in the present invention, an ITS application field may be further included in the header of the PDCP PDU. The following is an example of an ITS application type field according to the present invention.

ITS Application Type length: Y bits
This field is further included in the PDCP PDU header when the SDU-type field of the PDCP PDU header indicates ITS data or a value having meaning similar thereto. This field indicates to which ITS application data the PDCP SDU included in the PDCP PDU corresponds.

TABLE 5

| Bit | Description |
| --- | --- |
| 000 | Basic Safety Message |
| 001 | CAM message |
| 010 | DENM message |
| 011 | ITS application X |
| 100-111 | reserved |

For example, when a transmission side transmits CAM related ITS data, the PDCP of the transmission side may construct a PDCP PDU using the ITS data as a PDCP SDU. At this time, the PDCP entity of the transmission side sets an SDU type to indicate ITS data (011 is set when Table 4 is applied) and include the ITS application type field set to the ITS application type value (001 when Table 5 is applied) corresponding to the ITS data in the header of the PDCP PDU. The PDCP PDU is transmitted to a reception side.

When the reception side receives the PDCP PDU, the header of the PDCP PDU is checked. When the SDU type of the header indicates ITS data, the ITS application type field included in the header of the PDCP PDU is further checked. According to the ITS application type value set in the ITS application type field, the reception side may transfer data included in the PDCP PDU to the ITS application, that is, V2X application, indicated by the ITS application type.

Proposal 2-2

The present invention proposes a method of efficiently supporting various ITS/V2X applications or message sets at a PDCP layer. To this end, Proposal 2-2 of the present invention proposes notifying whether or not the PDCP SDU included in a PDCP PDU is for ITS using an SDU-type field included in a PDCP PDU header. In particular, Proposal 2-2 of the present invention proposes a method of extending a SDU type included in the header of the PDCP PDU, in order to provide for various application types corresponding to ITS/V2X and to support various applications other than ITS/V2X using ProSe.

If the SDU type included in the header of the PDCP PDU is set to a specific value, the specific value is used to indicate that the SDU type is extended. That is, the specific value may indicate that there is an additional related field. When the SDU-type field is set to the specific value, the PDCP layer of a reception side may regard the additional related field as being included in the PDCP PDU. For example, when the SDU type included in the header of the PDCP PDU is set to a specific value, the PDCP type field set to the specific value may indicate that another SDU type (hereinafter, extended SDU type) value is included in the PDCP PDU. When the SDU type included in the header of the PDCP PDU is set to a specific value, the PDCP type field set to the specific value may indicate to deduce finally an SDU type value using the specific value and the value of the additionally included SDU-type field.

The following is an example of an SDU-type field and an extended SDU-type field according to an embodiment.

SDU Type

Table 3 may be modified as follows according to Proposal 2-2 of the present invention.

length: 3 bits

PDCP SDU type, that is, layer-3 protocol data unit type. The PDCP entity may differently handle an SDU according to SDU type. For example, header compression may be applied to an IP SDU and may not be applied to ARP SDU. When the SDU type is set to 111, the extended SDU type is used.

TABLE 6

| Bit | Description |
| --- | --- |
| 000 | IP |
| 001 | ARP |
| 010 | PC5 Signaling |
| 011-110 | reserved |
| 111 | Use extended SDU Type |

When the SDU-type field is set to a specific value (e.g., 111 of Table 6), the specific value may serve to indicate that another SDU-type field having the same purpose as the SDU-type field is included in the PDCP PDU and the SDU type is discriminated using another SDU-type field.

Extended SDU Type example: X bits

This extended SDU type is used/included when the SDU type is set to 111.

TABLE 7

| Bit | Description |
| --- | --- |
| 0000 | Non-ITS application data type 1 |
| 0001 | ITS application data type 2 |
| 0010 | Non-ITS application data type 3 |
| 0011 | ITS application. CAM |
| 0100 | ITS application. BSM |
| 0101-1111 | reserved |

For example, assume that at least five new SDU types are required due to ITS and non-ITS application data type. However, it is difficult to express all existing SDU types and new SDU types using existing SDU type (see Table 3) fields. Accordingly, in the present invention, as described above, an extended SDU type is defined to indicate new application data types and a code point indicating each new application data type is allocated thereto. For example, if the SDU included in the PDCP PDU is IP, the SDU type in the PDCP PDU is set to 000 and the extended SDU field is not included in the PDCP PDU. If the SDU included in the PDCP PDU is CAM, the SDU type is set to 111 and an extended SDU-type field additionally set to 0010 is included in the header of the PDCP PDU and corresponding data is included in the PDCP PDU. A reception side may also perform similar operation. For example, the PDCP layer of the reception side processes or transfers the included SDU to the configured application according to the SDU type of the received PUD.

If the SDU type in the received PDU is set to 111, the PDCP layer of the reception side regards an extended SDU-type field as being additionally included in the PDU, reads the extended SDU-type field value, determines of which application data type the actually included SDU is and transfers the SDU to a corresponding application. In Tables 6 and 7, values such as 111, 0010, etc. are exemplary and may be replaced with other values.

The extended SDU-type field may be defined to discriminate not only the type of the ITS application data but also the type of the non-ITS application data. Extended SDU-type field values may be defined such that all protocols excluding IP, ARP and PC5 signaling are discriminated by the extended SDU type.

Proposal 2-3

As described above, when an ITS upper layer requests a 3GPP layer to transmit V2X related data, the data may in the form of IP packets or non-IP packets. Generally, a UE supports not only V2X communication but also data communication for basic communication purposes (e.g., Internet search, call or SMS). Accordingly, IP data may be V2X data or non-V2X data. Similarly, non-IP data may be V2X data or non-V2X data.

Accordingly, the present invention proposes notification of information more than discrimination between IP and non-IP in an SDU in order to accurately indicate to which V2X application the data included in a PDCP PDU is related, using a PDCP header. For example, the SDU type may be defined to discriminate among IP for non-V2X, IP for V2X, non-IP for non-V2X and non-IP for V2X. In other words, the SDU type may be defined to discriminate among IP data for non-ITS application, IP data for ITS application/protocol, non-IP data for non-ITS application and non-IP data for ITS application/protocol.

Table 3 defining the existing SDU type according to the present invention may be modified as shown in Table 8, for example. The values in Table 8 are arbitrarily designated and a mapping relationship between SDU types and bits values shown in Table 8 may be differently defined.

TABLE 8

| Bit | Description |
| --- | --- |
| 000 | IP (Non-V2X) |
| 001 | ARP |
| 010 | PC5 Signaling |
| 011 | IP (V2X) |
| 100 | Non-IP (Non-V2X) |
| 101 | Non-IP (V2X) |
| 110-111 | reserved |

In Proposal 2-3 of the present invention, a non-IP type data indicator may be added to SDU type information included in the PDCP header and the type of V2X and non-V2X data may be more accurately indicated. Accordingly, the PDCP entity of the reception side, which has received the PDCP PDU, may determine whether the data included in the PDCP PDU is IP data or non-IP data through the SDU-type field information. In addition, the PDCP entity of the reception side may determine whether or not the data included in the PDCP PDU is transferred to a V2X upper layer, and whether or not the data included in the PDCP PDU is V2X related data.

Proposal 2-3 of the present invention may be used together with Proposal 2-1 or 2-2. For example, if the SDU type indicates that the data included in the PDCP PDU is V2X related data, the PDCP PDU may include an additional field indicating to which V2X application the data corresponds. If the data included in the PDCP PDU is V2X related data, the PDCP entity of the reception side may determine whether or not there is an additional field (e.g., the ITS application type field of Table 5 or 7) indicating to which V2X application the data included in the PDCP PDU corresponds, according to the value set in the SDU-type field.

FIGS. 13A to 13D are PDCP PDU structures according to the present invention. FIGS. 13A to 13D are merely exemplary and, for convenience of description, the other fields in the PDCP PDU are not shown in FIGS. 13A to 13D.

Referring to Table 8 and FIG. 13A, when the SDU type is set to 000, the SDU type indicates that the data included in the PDCP PDU is non-V2X data of IP type. The PDCP PDU includes non-V2X data of IP type included in the PDCP SDU. The PDCP PDU does not include an ITS application type field for discriminating the type of V2X data.

Referring to Table 8 and FIG. 13B, when the SDU type is set to 011, the SDU type indicates that the data included in the PDCP PDU is V2X data of IP type. Since the SDU-type field indicates that V2X data is included in the PDCP PDU, the ITS application type field indicating the type of the V2X data is included in the PDCP PDU. When the ITS application type field is set to a value indicating V2X app A, the PDCP PDU includes data corresponding to V2X app A of IP type in the PDCP SDU.

Referring to Table 8 and FIG. 13C, when the SDU type is set to 100, the SDU type indicates that the data included in the PDCP PDU is non-V2X data of non-IP type. The PDCP PDU includes non-V2X data of non-IP type in the PDCP SDU. The PDCP PDU does not include an ITS application type field for discriminating the type of V2X data.

Referring to Table 8 and FIG. 13D, when the SDU type is set to 101, the SDU type indicates that the data included in the PDCP PDU is V2X data of non-IP type. Since the SDU-type field indicates that V2X data is included in the PDCP PDU, the ITS application type field indicating the type of the V2X data is included in the PDCP PDU. When the ITS application type field is set to a value indicating V2X app B, the PDCP PDU includes data corresponding to V2X app B of IP type included in the PDCP SDU.

In proposals of the present invention, "application" means "protocol" instead of application. That is, in proposals of the present invention, the application may be facilities or geonetworking.

A reception-side UE may receive a PDU from another UE or an eNB and process the PDU according to any one of the proposals of the present invention. For example, the reception-side UE may transfer the SDU to an upper layer or delete the SDU based on the SDU type (and an additional field) in the PDU according to proposals 1-1, 1-2 and/or 2 of the present invention.

A transmission-side UE may generate a PDU according to any one of the proposals of the present invention and transmit the PDU to another UE. For example, the transmission-side UE may generate a PDU including an SDU containing data from an upper layer according to proposals 1-1, 1-2 and/or 2 of the present invention.

The UE or the eNB may broadcast data of various V2X applications supported thereby in the form of MBMS. According to Proposal 2 of the present invention, each UE may notify the upper layer of the UE of only data corresponding to an application actually used/supported/installed by/in the UE among the application data broadcast by another UE or eNB.

For example, when there is a corresponding V2X application at the reception side, a corresponding SDU or the V2X data included in the corresponding SDU may be transferred to the upper layer (e.g., an ITS upper layer or an applications layer). When there is no corresponding V2X application, the corresponding SDU or the V2X data included in the corresponding SDU may not be transferred to the upper layer and may be deleted (e.g., at a 3GPP layer or a PDCP layer).

According to the present invention, in a mobile communication system supporting communication between vehicles, it is possible to efficiently discriminate the protocol state of an inter-vehicle communication application, to appropriately control the processing path of data in the mobile communication system and to apply optimal QoS to each datum.

According to the present invention, in a mobile communication system supporting a mobile broadband service, it is possible to efficiently process different types of data generated in different V2X applications.

According to the present invention, in a mobile communication system supporting a mobile broadband service, it is possible to efficiently support communication application services of a plurality of vehicles using radio resources, by discriminating upper application services in an existing communication protocol to support data processing.

In the present invention, the message of the same V2X application may be differently configured according to communication method. For example, the same V2X application message may be of IP type or non-IP type according to communication method. For example, when the message of a specific V2X application is transmitted to a UE through direct communication between vehicles without passing through an eNB, the message is generated in a non-IP type and, when the message of the specific V2X application is transmitted through the eNB, the message may be generated in an IP type. Whether the message of the same V2X application is of an IP type or a non-IP type may be identified according to Proposal 1-1 and/or 2 of the present invention. In other words, the proposals of the present invention are applicable to discrimination between the IP type and the non-IP type of the message of the same V2X application and processing of the message.

Figure 14:
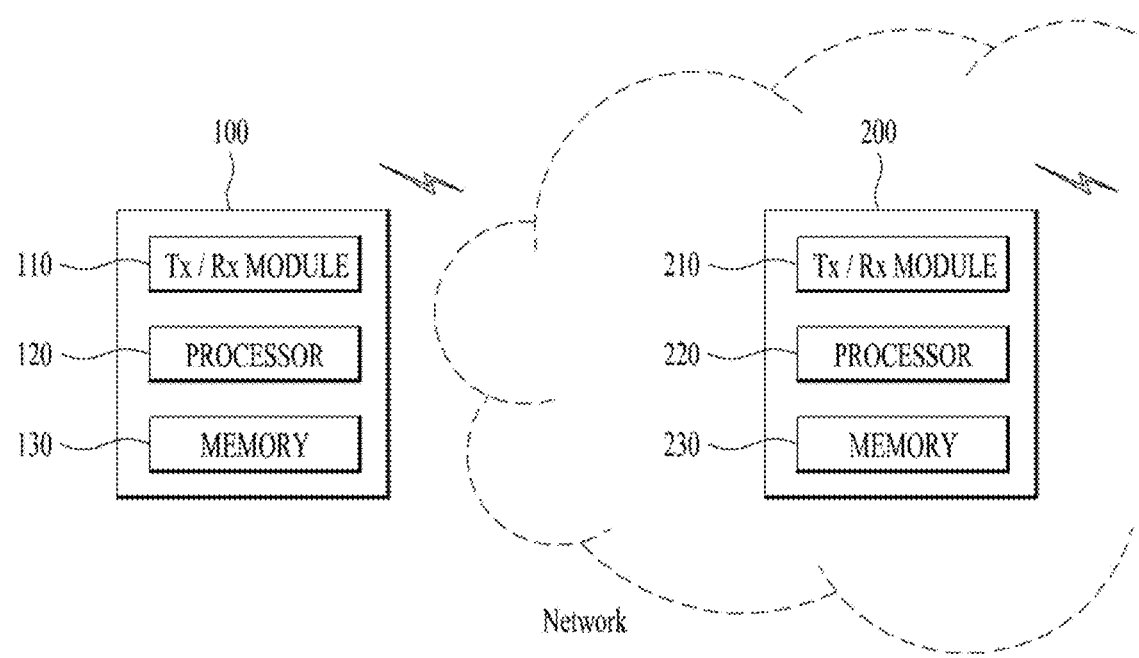
FIG. 14 illustrates a node according to an embodiment of the present invention.

FIG. 14 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 14, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The transceiver 110 of the UE may receive a protocol data unit (PDU) from another UE or the network apparatus. When a service data unit (SDU) type field in the PDU is set to a value indicating a vehicle-to-everything (V2X) type, the processor 120 of the UE may transfer the SDU included in the PDU to an upper layer or delete the SDU based on an additional field in the PDU. The additional field may indicate an application or protocol type corresponding to data of the SDU. The processor 120 may determine whether at least the data of the SDU is of IP type for V2X, IP type for non-V2X, non-IP type for V2X or non-IP type for non-V2X. The processor may transfer the SDU to the upper layer when the UE supports the application or protocol type and delete the SDU when the UE does not support the application or protocol type. The upper layer may be an intelligent transport systems (ITS) layer. The PDU may be a PDU of a communication layer which is a lower layer of the ITS upper layer. The communication layer may be, for example, a PDCP layer.

The processor 120 of the UE may generate a protocol data unit (PDU) including a service data unit (SDU) containing vehicle-to-everything (V2X) data generated at an upper layer. The processor 120 may generate the PDU to include an SDU-type field set to a value indicating that the SDU is of a V2X type. The processor 120 may generate the PDU to include an additional field indicating an application or protocol type corresponding to the data of the SDU. The transceiver 110 of the UE may transmit the PDU to another UE or the network apparatus. The SDU-type field may indicate at least whether the data of the SDU is of IP for V2X, IP for non-V2X, non-IP for V2X or non-IP for non-V2X. The upper layer may be an intelligent transport systems (ITS) layer. The PDU may be generated at a communication layer which is a lower layer of the ITS upper layer. The communication layer may be, for example, a PDCP layer.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method of receiving a data unit by a user equipment (UE) supporting vehicle-to-everything (V2X) communication in a wireless communication system, the method comprising:
   receiving a packet data convergence protocol (PDCP) protocol data unit (PDU); and
   transferring an upper layer data included in the PDCP PDU to an upper layer,
   wherein, based on a type of the upper layer data being related with a non-IP data, the PDCP PDU further includes an additional field,
   wherein, based on the type of the upper layer data being related with an IP data, the PDCP PDU does not include the additional field, and
   wherein the additional field informs an application or protocol type corresponding to the upper layer data.

2. The method according to claim 1,
   wherein the type of the upper layer data is informed based on a service data unit (SDU) type field in the PDCP PDU.

3. The method according to claim 1,
   wherein the upper layer data is transferred to the upper layer based on the UE supporting the application or protocol type and the upper layer data is discarded based on the UE not supporting the application or protocol type.

4. The method according to claim 1,
   wherein the upper layer is an intelligent transport systems (ITS) layer.

5. A user equipment (UE) supporting vehicle-to-everything (V2X) communication for receiving a data unit in a wireless communication system, the UE comprising:
   at least one transceiver;
   at least one processor; and
   at least one computer memory operably connectable to the at least one processor and storing instructions that, when executed, cause the at least one processor to perform operations comprising:
   receiving a packet data convergence protocol (PDCP) protocol data unit (PDU); and transferring an upper layer data included in the PDCP PDU to an upper layer,
wherein, based on a type of the upper layer data being related with a non-IP data, the PDCP PDU further includes an additional field,
wherein, based on the type of the upper layer data being related with an IP data, the PDCP PDU does not include the additional field, and
wherein the additional field informs an application or protocol type corresponding to the upper layer data.

6. The UE according to claim 5,
wherein the type of the upper layer data is informed based on a service data unit (SDU) type field in the PDCP PDU.

7. The UE according to claim 5,
wherein the processor transfers the upper layer data to the upper layer based on the UE supporting the application or protocol type and discards the upper layer data based on the UE not supporting the application or protocol type.

8. The UE according to claim 5,
wherein the upper layer is an intelligent transport systems (ITS) layer.

9. A method of transmitting a data unit by a user equipment (UE) supporting vehicle-to-everything (V2X) communications in a wireless communication system, the method comprising:
obtaining, from an upper layer, an upper layer data and a type of the upper layer data;
generating a PDCP protocol data unit (PDU) including the upper layer data,
wherein, based on the type of the upper layer data being related with a non-IP data, the PDCP PDU further includes an additional field, and
wherein, based on the type of the upper layer data being related with an IP data, the PDCP PDU does not include the additional field; and
passing the PDCP PDU to a lower layer for transmission,
wherein the additional field informs an application or protocol type corresponding to the upper layer data.

10. The method according to claim 9, wherein, the type of the upper layer data is obtained by receiving a service data unit (SDU) type from an upper layer.

11. The method according to claim 9,
wherein the upper layer is an intelligent transport systems (ITS) layer.

12. A user equipment (UE) supporting vehicle-to-everything (V2X) communication for transmitting a data unit in a wireless communication system, the UE comprising:
at least one transceiver;
at least one processor; and
at least one computer memory operably connectable to the at least one processor and storing instructions that, when executed, cause the at least one processor to perform operations comprising:
obtaining, from an upper layer, an upper layer data and a type of the upper layer data;
generating a PDCP protocol data unit (PDU) including the upper layer data,
wherein, based on the type of the upper layer data being related with a non-IP data, the PDCP PDU further includes an additional field, and
wherein, based on the type of the upper layer data being related with an IP data, the PDCP PDU does not include the additional field; and
passing, to a lower layer, the PDCP PDU for transmission,
wherein the additional field informs an application or protocol type corresponding to of the upper layer data.

13. The UE according to claim 12,
wherein the type of the upper layer data is obtained by receiving a service data unit (SDU) type from an upper layer.

14. The UE according to claim 12,
wherein the upper layer is an intelligent transport systems (ITS) layer.

* * * * *